(12) United States Patent
Chattopadhyay et al.

(10) Patent No.: US 6,464,769 B2
(45) Date of Patent: Oct. 15, 2002

(54) METHOD FOR THE PRODUCTION OF METALLIC FLAKE PIGMENTS

(75) Inventors: Arun Kumar Chattopadhyay, Morristown, NJ (US); Talal Soufanati, Wanaque, NJ (US); Michel Moffatt, Morris Plains, NJ (US); Thomas Aquinas Barry, Tramore (IE); Samir Sanyal, Quebec (CA)

(73) Assignees: US Aluminum Inc., Haskell, NJ (US); Shamrock Aluminium Limited, County Waterford (IE); Canbro INC, Quebec (CA)

( * ) Notice: Subject to any disclaimer, the term of this patent is extended or adjusted under 35 U.S.C. 154(b) by 0 days.

(21) Appl. No.: 09/824,062

(22) Filed: Apr. 3, 2001

(65) Prior Publication Data

US 2002/0005144 A1 Jan. 17, 2002

Related U.S. Application Data

(63) Continuation-in-part of application No. 09/541,513, filed on Apr. 3, 2000, now abandoned.

(51) Int. Cl.[7] .............................. C09C 1/00; C09C 1/62; C09C 1/64
(52) U.S. Cl. ....................................... 106/403; 106/404
(58) Field of Search ................................. 106/403, 404

(56) References Cited

U.S. PATENT DOCUMENTS 3,615,341 A * 10/1971 Rolles ......................... 106/404
4,484,951 A * 11/1984 Uchimura et al. ........... 106/404

* cited by examiner

*Primary Examiner*—Anthony J. Green
(74) *Attorney, Agent, or Firm*—Jacobson Holman, PLLC

(57) ABSTRACT

A method of manufacturing metallic, especially aluminum flake pigments comprises comminuting metallic flake particles in an inert solvent such as mineral spirit and in-line screening of the slurry thus formed in at least two in-line cylindrical rotary screens with different mesh size. The screening system is fully enclosed to avoid solvent emissions. The finished product has consistent flake particle size distribution with brighter metallic finishes than conventionally produced products.

15 Claims, 2 Drawing Sheets

METHOD FOR THE PRODUCTION OF METALLIC FLAKE PIGMENTS

This is a continuation in part of U.S. Ser. No. 09/541,513 filed Apr. 3, 2000, and now abandoned.

INTRODUCTION

The invention relates to the production of metallic flake aluminum pigments.

Aluminum flake pigments are used as silver metallic pigments in paints and ink industries. The flake pigments are referred to as leafing and non-leafing types. They may be in the form of dry powders or pastes. Aluminum pigments are conventionally manufactured by milling aluminum of various available physical forms, for example, granular or spherical particles, foils or shredded foils, in hydrocarbon liquids. Fatty acids are used as lubricants in the process. With the addition of a small quantity of a suitable lubricant in a milling or grinding medium consisting of an inert hydrocarbon liquid, which is conventionally known as mineral spirit, slurries comprising flaked aluminum pigments of desired product quality are produced. Depending upon the nature of milling actions for example the time, speed, temperature, milling media, feed rate and charge weight ratios, the final configuration of the flaked pigment particles and the degree of particle fineness are determined. However, due to the randomness of the process the aluminum flake slurries thus produced contain a very wide distribution of flake particle sizes. Thus, in order to produce flake pigments of desired size distribution, it is required to screen the slurries to remove the coarser sized particles. The screening process is one of the major process steps that control the quality of a particular pigment type. After screening, the slurry is further concentrated as filter cakes by removing most of the hydrocarbon liquid through a filter press. The filter cakes are then blended as pastes of desired aluminum metal pigment concentration.

One problem with these conventional methods of manufacture is that hydrocarbon solvents, for example, mineral spirits containing volatile organic, both small and medium range aliphatic and complex aromatic molecules are used. Because of the nature of the process there is always some solvent discharge to the atmosphere. There is growing concern over discharging organics into the environment. They can form various toxic radicals through complex photochemical processes.

Conventionally, the slurries are screened to remove coarser sized particles using vibratory screens, for example those available from Sweco. These are generally open systems in which the product slurries are discharged on a wire mesh of certain permissivity mounted on a vibratory bed. The screened slurries are collected for product processing and the screen residue, hereinafter referred to as oversize, is collected separately for reprocessing. To increase the screening efficiency and to avoid screen blocking, the product slurries are often diluted by adding more solvents while screening. The major drawbacks of this system include:

a) high over-size build-up on the screen, b) requires large space, c) scope of solvent emission is always higher (can be controlled but cannot be eliminated), d) limited production yield of finer grade products by multi-stage screening, and e) longer processing time.

Generally, the oversize produced by such conventional screening systems contains a large portion of entrapped products that fail to pass through the screen because of the increased restrictions of the available screen surface area as screening progresses. For fiber recovery of the product from the oversize, the oversize is diluted to a desired strength and re-screened. This is highly inefficient.

There is therefore a need for an improved method for the production of flake aluminum pigments which will address these problems.

STATEMENTS OF INVENTION

According to the invention there is provided a method of manufacturing metallic flake pigments with improved product properties comprising:

comminuting metallic flake particles in an inert solvent; and in-line screening of the slurry thus formed on an in-line screening device.

The method of the invention provides considerable operational advantages because of its flexibility, efficiency, safety and environmental friendliness. The finished product produced by the method of the invention has consistent flake particle size distribution with brighter metallic finishes than products produced using conventional techniques. The method allows several different products with different flake particle size and optical properties to be produced. The method also allows selective production of a flake pigment by in-line particle size classification(s). Productivity and product quality are greatly improved.

In a particularly preferred embodiment of the invention the in-line screening is carried out by passing the slurry through a cylindrical screen.

Preferably the method includes the step of rotating the screen.

In one embodiment of the invention the in-line screening comprises at least two sequential in-line screening devices with screens of different mesh size. Preferably, the mesh size of the screens decreases in the downstream direction.

In a preferred embodiment of the invention the method includes the steps of:

periodically closing the flow of slurry to the in-line screening device;

flushing the screening device in-line; and stopping flushing and continuing the flow of slurry to the flushed in-line screening device.

In this case preferably the method includes the step of monitoring the pressure drop across the screening device, stopping the flow of slurry and commencing in-line flushing in response to a pressure drop above a pre-set value.

Preferably the method includes the step of recycling oversize material from the in-line screening device.

The metallic flake pigments are usually aluminum flake pigments which may be of a leafing or non-leafing category.

In one embodiment of the invention the method comprises the step of mixing the residues from at least some of the screening units.

The invention also provides metallic flake pigments produced by the method of the invention.

DETAILED DESCRIPTION

The present invention provides an in-line screening system that is equipped with closed sequential product screening lines for efficient product classifications, and fitted with continuous reprocessing systems for the oversize product collected from each unit. This process enables products to be manufactured efficiently, in a safer, environmentally friendly and economic manner.

Figure 1:
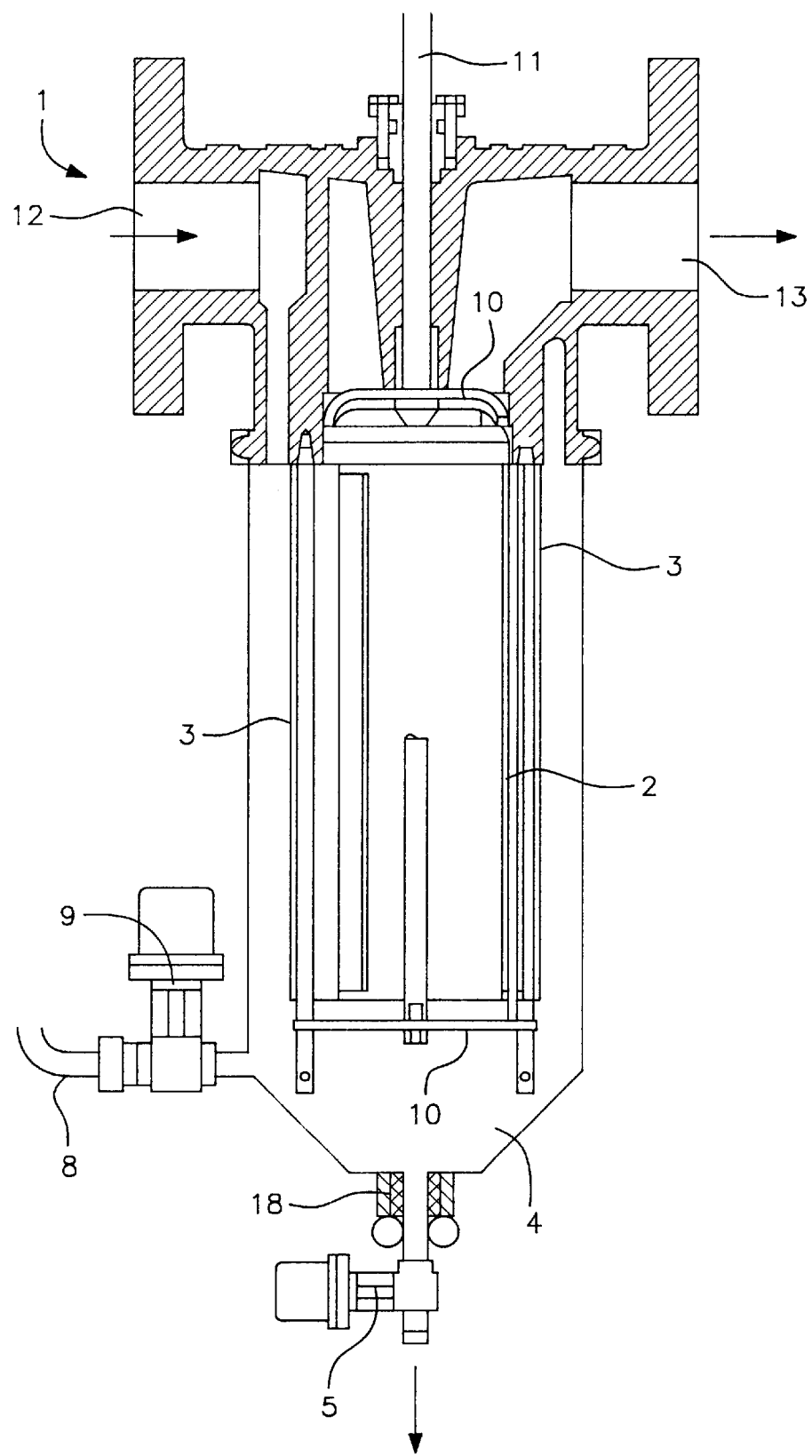
FIG. 1 is a schematic representation of a self-cleaning rotary cylindrical screening device used in the invention.

Referring initially to FIG. 1 there is illustrated an in-line screening device 1 having a rotary cylindrical screening element 2 constructed from stainless steel wedge wire. The screen 2 is fixed between end plates 10 which are rotated by a shaft 11 driven by a motor (not shown). Slurry flows into the device 1 through an inlet 12 and slurry from which oversize material has been removed is discharged through an outlet 13. The surface of the screening or filtering element is cleaned by scraping off the residue continuously while rotating against a pair of stationary scraper blades 3 made of either Teflon™ or stainless steel. A device of this basic construction was provided by MM Industries Inc., Salem, Ohio, USA. The basic unit is commercially used for water filtration. The system is known to be used for filtering liquids containing minimum suspended solids. A similar system is also used for filtering paints and ink. The use of the similar versions was also carried out using Ronningen-Petter and Russel Finex type of systems comprising either wedge wire or perforated micro screens. The use of the improvised version of the device of the present invention to screen and classify metal flake pigments is not known in the metal flake industries. Besides its newly found safer yet economic applications for metallic pigment manufacture, the greatest advantage of using the in-line screening system of the present invention is, it improves product qualities by efficient classification. Yet another advantage of this process is, it provides high flexibility of simultaneous production of several products from single flake slurry, The system is highly advantageous for both continuous as well as batch-milled products. The in-line screening system of the present invention is fully enclosed which makes it safer to use and highly desirable as a replacement for conventional vibratory screening systems.

In the invention oversize particles are continuously removed from the surface of the screen element and settle at the bottom 4 of the screening unit. As the oversize builds up, the pressure drop across the screen increases, i.e. the pressure required to allow materials to pass through the screen becomes higher. In order to ensure ease of passage of the particles through the screen, the system is preset with a limiting switch that opens a valve 9 on a solvent flushing line 8 above a certain pressure drop to blow-down the oversize through a valve 5 on an oversize discharge port 18 to an oversize collection tank (not shown).

Figure 2:
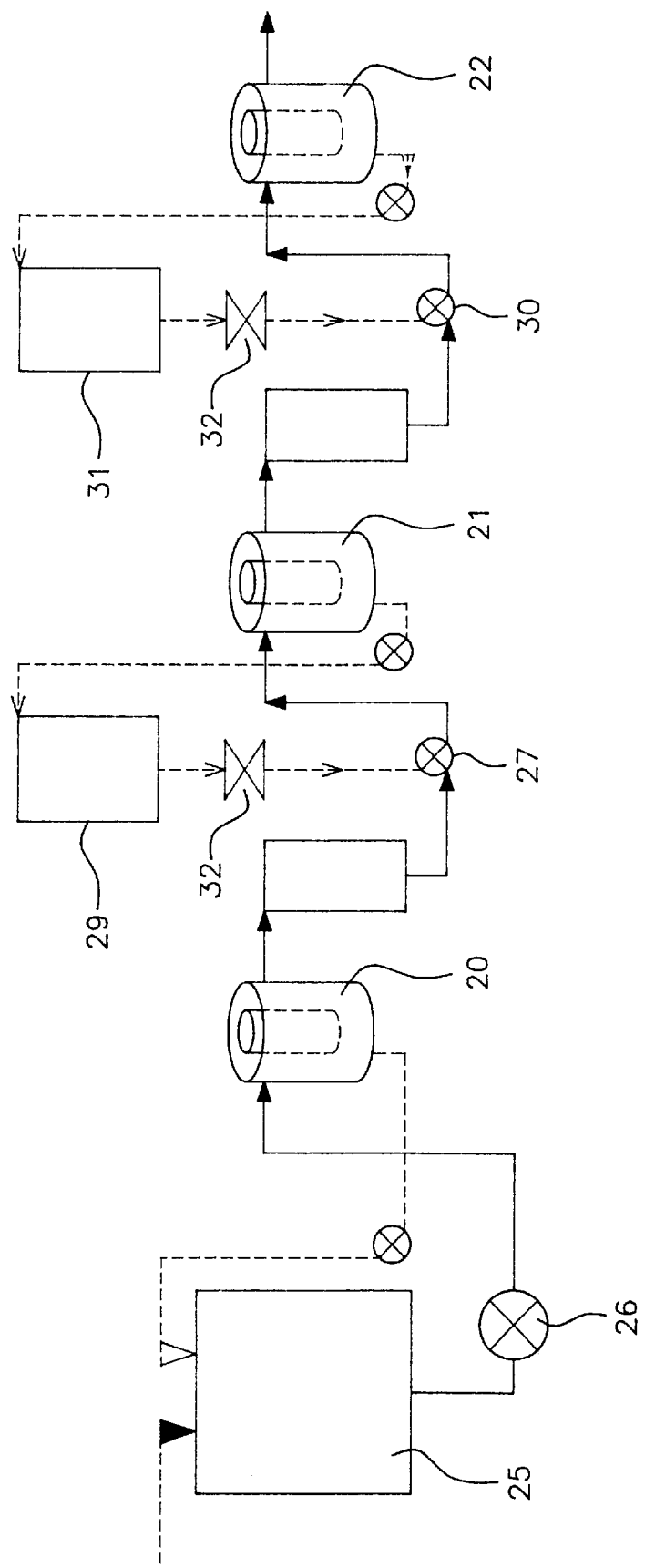
FIG. 2 is a schematic representation of a multi-stage in-line screening system used in the invention.

Referring to FIG. 2 there is illustrated a screening system in which a number, in this case three in-line screening devices 20, 21, 22, each of the same construction as illustrated in FIG. 1, are connected in series. Slurry from a ball mill 25 is pumped by a pump 26 to the first screening unit 20 from which oversize particles above 55 $\mu$ are returned to the ball mill 25. Slurry containing particles less than 55 $\mu$ are delivered by a pump 27 to the second in-line screening device 21 in which oversize particles above 40$\mu$, are removed and delivered to an oversize tank 29 for recycling. Slurry containing particles less than 40 $\mu$ are delivered by a pump 30 to the third in-line screening device 22 in which oversize particles above 25 $\mu$ are removed and delivered to a second oversize tank 31.

The oversize particles from each screen unit 20, 21, 22 are recovered by activating a solvent flushing system integrated with the in-line screening device.

The oversize particles retained in oversize tanks 29 and 31 are returned for re-screening. A valve 32 is opened to release the oversize particles back into the main line where they are delivered by a pump 27, 30 to the in-line screening device 21 and 22 respectively.

Thus, the invention provides an efficient method of classifying products with respect to their particle size distribution. An improved method vis-à-vis conventional vibratory screens for product screening is provided.

The invention also provides for the manufacture of metallic pigments which can be used to customise products of well characterised opacity and other relevant optical properties by blending suitably the pigments extracted from each screening unit.

To obtain a high quality optical effect from the metallic pigments, which are of thin platelet forms, it is important to create a condition of homogeneity in the alignment of the pigment particles on the paint films. A wide particle size distribution interferes with the alignment that adversely affects the light reflection properties from the paint films and obscures brightness or metallic colour effects. To heighten the metallic pigment effects, particle size classification plays a very important role in pigment industries. The conventional manufacturing practices involve milling pre-classified aluminum granules or spheres of well defined particle size distribution and following further (multistage) screening through vibratory sieves. The conventional method is time-consuming and often it is difficult to maximise the yield.

According to the invention, aluminum granules or spheres of coarser nature are subjected to a wet comminution grinding circuit in which the metallic particles are maintained within an inert medium, especially petroleum naphtha or mineral spirit. The slurry bearing the comminuted particles is withdrawn from the comminuting operation and subjected to a screening operation to remove oversize particles. The fractions containing coarser particles from each screening unit are returned for re-screening to optimise oversize generation. The fractions containing desirable particle size distributions are removed from the circuit and subjected to filtration and blending in order to obtain an aluminum flake paste of desired metal concentration, which is normally 65 wt % of the total paste. To compare the process as well as production efficiencies, a similar comminution operation was carried out following a conventional sieving using Sweco vibratory sieves.

The invention will be more clearly understood from the following description thereof given by way of example only.

EXAMPLE 1 (COMPARATIVE EXAMPLE)

A standard leafing grade product, 130 type of leafing aluminum paste of US Aluminum Inc., was produced from two consecutive batches of ball mill slurries. The screen operation was carried out by the conventional 48 inch Sweco vibratory screen of mesh size 220 (approximately 55$\mu$). Each batch of the flake pigment slurry was produced by comminuting 187 lb of aluminum granules for 5 hr in a 3×12 ft mill in the presence of 208 lb of mineral spirit and 9 lb of stearic acid. Each batch of milled slurry was washed with 1000 lb of mineral spirit and stored in a tank prior to a screening operation. The total amount of slurry thus obtained from the two batches contained approximately 374 lbs of metal, 2416 lbs of mineral spirit and 18 lbs of stearic acid. The slurry was then screened through a Sweco vibratory screen. The screened slurry was then passed through a filter press. The filter cakes collected from the filter press were then blended with required amount of mineral spirit to form type 130 paste of 65% solids content.

EXAMPLE 2

As for Example 1 to produce leafing grade type 130 paste. In this case the screening was carried out by an in-line screening unit fitted with 55 micron cylindrical rotary screen of diameter 2 inches as described above.

The operational parameters as well as the product properties of 130 aluminum pastes produced according to the Examples 1 and 2, were compared. The results are shown in table 1.

TABLE 1

Process and quality data of 130 pastes produced according to Examples 1 and 2.

| Parameters & Properties | Example 1 (Comparative example) | Example 2 |
|---|---|---|
| Screening Time | 2 hr 30 min | 1 hr 45 min |
| Oversize generation (Based on total aluminum) | 20 lbs | 1.5 lbs |
| Increase in yield based on total aluminum | | −15% |
| Leafing value (%) | 60 | 65 |
| Retention on 325 mesh (%) | 1.2 | 1.1 |
| Particle size ($\mu$) by McIvan Mastersizer | D10  4.3<br>D50 15.6<br>D90 40.8 | D10  4.5<br>D50 15.4<br>D90 37.6 |
| Optical properties of 0.0015 mm paint film containing 2.5% aluminum | Film Opacity: 92%<br>Brightness:<br>Standard | 95%<br>Brighter than<br>Ex.1 |

EXAMPLE 3

As in Example 2, with an increased stearic acid content (12 lb instead of 9 lb). The milled slurry was passed through a series of three screen units connected in sequence according to their screen sizes, for example 100 micron, 55 micron and 40 micron. The oversize residues collected from the 55 micron and 40 micron screens were passed through the respective screens at least 3 times to remove most of the finer particles. The residues from the 55 micron and the 40 micron screens were filtered through a small filter press and the filter cakes of the individual products were blended with the required amount of mineral spirit to form pastes containing 70% solids. These pastes were compared with a product 10C manufactured as a precursor of standard commercial grade leafing powder (905 of U.S. Aluminum), singularly or in combination. Similarly, the screened slurry from the 40 micron screen was also filtered separately and the filter cakes were blended and compared with an aluminum paste manufactured as a precursor of a standard finer grade leafing product, (807, of U.S. Aluminum). The results are shown in table 2, 3 and 4. This example demonstrates the advantage of producing several products utilising a single production slurry. According to the standard method of production, 807FC being a finer grade product than 130 paste requires a longer processing time.

Average rates of production of the filter cake forms of 807FC and 130 are 28 lb/hr and 47 lb/hr respectively. The product obtained from the slurry passing through the 40 micron screen is of similar property as that of 807FC and it improves the rate of production of 807FC from 28 lb/hr to greater than 33 lb/hr.

TABLE 2

| Retention | +100$\mu$ Screen | +55$\mu$ Screen | +40$\mu$ Screen | Total metal content in the pigment slurry ex 40$\mu$ screen |
|---|---|---|---|---|
| Oversize % (Based on total aluminum) | <0.1 lb | 1.5 lb | 45 lb | −325 lb |

TABLE 3

Pigment properties of the material ex 40 micron screen as compared with the standard 807FC of U.S. Aluminum.

| Pigment type | Particle size ($\mu$) | Leafing | Retention +325 mesh screen | Film opacity | Film Brightness | Production Yield lb/hr |
|---|---|---|---|---|---|---|
| Pigment Ex 40 micron screen | D10  3.7<br>D50 10.3<br>D90 23.5 | >80% | Trace | >99% | Smoother Brighter Han 807FC | >33 |
| 807FC | D10  3.3<br>D50 10.5<br>D90 29.6 | 70% | 0.1% | 97% | Less Smooth and bright | 28 |

EXAMPLE 4

The residues collected as oversize particles from the screening units fitted with 55 micron and 40 micron screens as in Example 3 were blended and compared with a leafing paste produced as a precursor of a standard grade aluminum powder, 905, of US Aluminum.

TABLE 4

Pigment properties of oversize collected from 40 micron and 25 micron screens.

| Pigment Type | Particle Size | Leafing % | Film Optical Properties |
|---|---|---|---|
| Residue from 40$\mu$ screening unit of Ex. 3 | D10  26.2<br>D50  43.8<br>D90  53.2 | 78 | Uniform, White, Bright, Sparkle Opacity: 81% |
| Combination of residues from 55$\mu$ and 10$\mu$ screens of Ex. 4 | D10  28.7<br>D50  48.2<br>D90  68.6 | 74 | Uniform, High Sparkle, Opacity: 78% |
| 10 C | D10  16.8<br>D50  53.4<br>D90 112.6 | 75 | Very coarse film than that of 40$\mu$ residue of Ex. 3 |

EXAMPLE 5

Similar experiments to those of the above examples were carried out with a standard leafing grade, 180 aluminum paste from US Aluminum. The 180 paste was produced by re-milling filter cakes of US Aluminum 130 paste as described in Example 1. The 180 paste consists of very fine aluminum flake particles of average particle size of from 5 to 9 micron. As standard practice, the re-milled slurry is screened through a 400 mesh (−40 micron) vibratory screen prior to filtration through a filter press. Under given production conditions, this involves a very long processing time with a rate of less than 15 lb/hr with respect to the total aluminum content.

According to the present invention, a similar product was manufactured from the aluminum flake slurry as in Example 3 and screened through a series of in-line screens comprising 55 micron, 40 micron and 25 micron. The slurry passing through the 25 screen was filtered through a filter press and the filter cake was compared with the 180 leafing grade aluminum paste (results are given in Table 5). This process demonstrated an improvement in the production rate (greater than 22 lb/hr versus less than 15 lb/hr) and product quality. The oversize residue obtained from the 55 micron, 40 micron and 25 micron screens were blended together and compared with another standard leafing grade product, 16C, a precursor of 908 leafing powder from US Aluminum. The product obtained from the screen residues of the present Example demonstrated a major improvement in the product quality of 16C with respect to the optical property.

TABLE 5

| Pigment type | Particle size micron | Leafing powder % | Film Property | Production rate |
|---|---|---|---|---|
| 180 Paste | D10 3.8<br>D50 8.5<br>D90 25.2 | 70 | Medium Gloss | <15 lb/hr |
| Pigment ex 25μ screen | D10 3.0<br>D50 6.9<br>D90 13.7 | 80 | High Gloss, Whiter, Higher film opacity | >22 lb/hr |

EXAMPLE 6

As in Example 1, a full batch of aluminum slurry comprising two milling cycles containing 380 lb of aluminum, 422 lb of mineral spirit and 14 lb of unsaturated fatty acid, was prepared to evaluate a standard non-leafing product 7125 (precursors of 125NL paste and 804NL powder of U.S. Aluminum). Each milling cycle continued for 5 hr in a 3'×12' mill. The milled slurries were washed with 2000 lb of mineral spirit and stored in a tank. A part of the slurry was screened through a vibratory Sweco screen of 230 mesh size (−55μ) and another part was screened by the method of the present invention using cylindrical rotary 55 micron screen. The screened slurries thus obtained from the vibratory screen and the in-line screening unit were further filtered separately, and the filter cakes were blended to pastes containing solids of 71%. The production output and the product qualities of the 7125 product thus prepared were compared (results are shown in Table 6).

TABLE 6

| Pigment Type | Oversize/ 1000 lb slurry (total aluminum content) | Screening Time (min)/ 1000 lb slurry | Particle size (μ) | Film Property |
|---|---|---|---|---|
| 7125 standard | 15.8 lb | 1 hr | D10 4.0<br>D50 14.8<br>D90 40.8 | Characteristic appearance |
| 7125, of the present invention | 0.5 lb | 40 min | D10 4.2<br>D50 14.4<br>D90 38.6 | Whiter than standard 7152 |

EXAMPLE 7

A slurry as prepared in Example 6 underwent simultaneous screening through a pair of in-line screens of 55 micron and 40 micron sizes. The non-leafing aluminum paste obtained from the residues of the 55 and 40 micron screening units was compared against a standard non-leafing grade aluminum paste product, 10NL. The aluminum paste obtained from the slurry ex 40 micron screen was compared with a standard finer grade aluminum paste 7160 (also a precursor of 806NL, a standard grade non-leafing aluminum powder of U.S. Aluminum). This example demonstrates that several products of non-leafing grade aluminum pigments can be produced from a suitable aluminum slurry with higher productively and quality (results are given in Table 7).

TABLE 7

| Pigment Type | Particle size (μ) | Film property | Production Rate |
|---|---|---|---|
| 7160 | D10 3.4<br>D50 11.3<br>D90 34.0 | Characteristic appearance | 22–27 lb/hr |
| Paste from ex 40μ slurry | D10 3.5<br>D50 10.5<br>D90 27.8 | Uniform, Higher opacity, Whiter | 34 lb/hr |
| 10NL | D10 11.2<br>D50 52.4<br>D90 116.6 | Characteristic appearance | |
| Paste from the residues of the 55 and 40μ screens | D10 12.8<br>D50 46.1<br>D90 70.5 | Uniform, Sparkling, Whiter | |

EXAMPLE 8

Comparative example of the reproducibility of the particle size distribution of 7160 type aluminum pastes, as in Example 7, produced by the method of the present invention. These results are also compared with 7160 paste produced by conventional means. The conventional production of 7160 pastes involves milling aluminum granules of 154 lb with 200 lb of mineral spirit and 6 lb of unsaturated fatty acid for 7 hr. The milled slurry after being diluted with additional 1000 lb of mineral spirit is screened by a Sweco vibratory screen of 325-mesh size. The screened slurry is then filtered through a filter press. The filter cakes obtained from the filter press are blended into a paste containing 70% solids. Table 8 gives the results of three successive batches produced by each method. In order to simulate the condition of possible variations in production conditions due to some external factors and human errors that may alter the product quality, the conditions of 7160 paste manufacture of the present example produced according to the conventional method mentioned above, were varied slightly either in milling time, or in the mode of screening or in mill charge ratios. Similar variations were also followed to produce 7125 paste of Example 6 to produce 7160 pastes according to the method of the present invention as discussed in Example 7. The results indicate that regardless of the changes in process conditions the method of the present invention offers consistency and minimum variations in the particle size distribution, which are indicative of their consistent optical properties.

TABLE 8

| | 7160 produced by conventional method | | | 7160 produced by the present method of invention | | |
|---|---|---|---|---|---|---|
| Run No. | 1 | 2 | 3 | 1 | 2 | 3 |
| Particle Size | D10 3.5<br>D50 11.9<br>D90 35.2 | 2.9<br>9.4<br>30.6 | 3.8<br>12.4<br>37.2 | 3.5<br>10.5<br>27.8 | 3.2<br>10.1<br>27.3 | 3.3<br>10.4<br>28.2 |

EXAMPLE 9

Ronningen-Petter system of model no DCF-400 cylindrical filter was fitted with a 50 micron vertical wedge wire screen to screen the standard leafing type slurries. The screened slurries were filtered and the filter cakes were compared with the filtercakes obtained by screening the slurries through a conventional Sweco vibratory screen of mesh size of 75 micron. Slurry flow rate through the screens sieve retention value and point file properties are given below:

| Sample Details | Slurry flow rate through the screen | % Retention on 45μ screen | Film opacity | Film brightness |
|---|---|---|---|---|
| Post Sweco screen | 30 L/min | 3.7% | Characteristic | Characteristic |
| Post DCF | 55 L/min | 1.8% | Higher | Improved |

EXAMPLE 10

A similar type of slurry as described in example 9 was first screened through a 150 micron microscreen cylindrical filter from Russel Finex and further screened through a 50 micron wedge wire cylindrical screen. The filter cakes obtained from these screened slurries were compared with filter cakes produced via conventional screening by a Sweco vibratory filter using 75 micron screen. 45 micron sieve retention values and paint film brightness are given below.

| Sample Details | 45μ sieve retention | Film Brightness |
|---|---|---|
| Post Sweco screen | 1.4% | Characteristic |
| Experimental | 1.2% | Brighter |

The invention is not limited to the embodiments hereinbefore described which may be varied in detail.

What is claimed is:

1. A method of manufacturing metallic flake pigments comprising:
   comminuting metallic flake particles in an inert solvent to form a slurry; and
   in-line screening of the slurry thusd formed on an in-line screening device.

2. A method as claimed in claim 1 wherein the flake pigments are selectively produced by in-line particle size classification.

3. A method as claimed in claim 1 wherein the in-line screening is carried out by passing the slurry through a cylindrical screen.

4. A method as claimed in claim 3 including the step of rotating the cylindrical screen.

5. A method as claimed in claim 1 wherein the in-line screening comprises at least two sequential in-line screening units with screens of different mesh size, the slurry traveling between the in-line screening units in a downstream direction, each screening unit producing a residue.

6. A method as claimed in claim 5 wherein the mesh size of the screens decreases in the downstream direction.

7. A method as claimed in claim 1 including the step of recovering oversize removed by the in-line screening device, the oversize being recovered by activating a solvent flushing system integrated with the in-line screening device.

8. A method as claimed in claim 1 including the steps of;
   periodically closing the flow of slurry to the in-line screening device,
   flushing the screening device in-line; and
   stopping flushing and continuing the flow of slurry to the flushed in-line screening device.

9. A method as claimed in claim 8 including the step of monitoring the pressure drop across the screening device, stopping the flow of slurry and commencing in-line flushing in response to a pressure drop above a pre-set value.

10. A method as claimed in claim 1 including the step of recycling oversize material from the in-line screening device.

11. A method as claimed in claim 1 including the step of recycling pigment along closed recycling loops connected to the in-line screening device.

12. A method as claimed in claim 1 wherein the metallic flake pigments are aluminum flake pigments.

13. A method as claimed in claim 12 wherein the aluminum flake pigments are non-leafing flake pigments.

14. A method as claimed claim 12 wherein the aluminum flake pigments are leafing flake pigments.

15. A method as claimed in claim 5 comprising the step of mixing the residues from a plurality of the screening units.

* * * * *